Aug. 1, 1961 T. H. BANTON 2,994,553

COMBINATION SERVING TONG SET

Filed Dec. 30, 1959 4 Sheets-Sheet 1

INVENTOR

Theodore H. Banton

BY

Peck & Peck

ATTORNEYS

Aug. 1, 1961 T. H. BANTON 2,994,553

COMBINATION SERVING TONG SET

Filed Dec. 30, 1959 4 Sheets-Sheet 2

INVENTOR

Theodore H. Banton

BY

Peck & Peck

ATTORNEYS

INVENTOR
Theodore H. Banton

BY

Peck & Peck
ATTORNEYS

Aug. 1, 1961 T. H. BANTON 2,994,553

COMBINATION SERVING TONG SET

Filed Dec. 30, 1959 4 Sheets-Sheet 4

INVENTOR
Theodore H. Banton
BY
Peck & Peck
ATTORNEYS

United States Patent Office 2,994,553
Patented Aug. 1, 1961

1

2,994,553
COMBINATION SERVING TONG SET
Theodore H. Banton, Little Valley, N.Y., assignor to Cattaraugus Cutlery Company, Little Valley, N.Y., a corporation of New York
Filed Dec. 30, 1959, Ser. No. 862,898
1 Claim. (Cl. 294—106)

This invention relates broadly to the cutlery arts and in its more specific aspects it relates to a pair of cutlery members, for instance, a fork and a spatula, which may be used separately in a more or less conventional manner, or may be pivotally removably associated together forming serving tongs which are versatile in the many uses to which they may be put; and the nature and objects of the invention will be readily recognized and understood by those skilled in the art to which it relates in the light of the following explanation and detailed description of the accompanying drawings illustrating what I at present believe to be the preferred embodiment or mechanical expressions of my invention from among various other forms, arrangements, combinations and constructions, of which the invention is capable within the spirit and scope thereof.

Serving tongs are used for a variety of purposes in the food service field, but as far as I am aware, all such implements which have heretofore been produced are useful only as tongs, and may not be used where a fork, spatula, knife or the like is needed. Service tongs of the character in which I am particularly interested may comprise a fork operatively associated with either a spatula like member, a spoon of normal serving spoon dimensions, or the like member which coacts with the fork to lift and serve food. While such tongs are useful and perhaps satisfactory for the particular work for which they were designed, their utility is specifically limited and they are definitely lacking in functional versatility.

I have recognized this use limitation which is inherent in conventional cutlery tongs and I have devised a serving tong set which overcomes the shortcomings of prior serving tong sets and substantially enlarges the field of use of such cutlery.

I have accomplished this broadening utility of serving tong sets without sacrificing their efficiency and ease of operation when used as a pair of serving tongs.

The serving tong set which I have devised broadly involves two members, namely, a serving fork and a spatula or the like, which may be used separately or may be operatively removably associated to provide a serving tong set. Thus, the fork may be used separately for the many uses to which a serving fork may be put, as may the spatula, but I have provided means on each member so that the two members may be pivotally connected together for relative pivotal action in the usual manner of tongs. The means which are provided on each member are easily cooperatively connected together and separated so that no skill is required in connecting the members for operation as tongs or for separating them for their individual uses.

In accomplishing my purposes I have not resorted to any moving parts, catches, hooks, pins or other extraneous parts to cause the desired connected relationship between the fork member and the spatula or the like member. All that is required to connect and disconnect the two members is a simple relative manipulation thereof.

The arrangement which I have devised does not detract from the attractive appearance of the two members. It does not add substantially to the cost of their production, and since there are no moving parts to get out of order, the members will last for an indefinite time.

I have devised a novel and ingenious arrangement wherein the means on each member which coact to

2 pivotally mount the members together serve dual functions. For instance, the means on one member also functions to open cans and remove compression caps from jars, while the means on the other member also serves as a bottle cap remover and a punch for punching holes in cans.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings.

Figure 1:
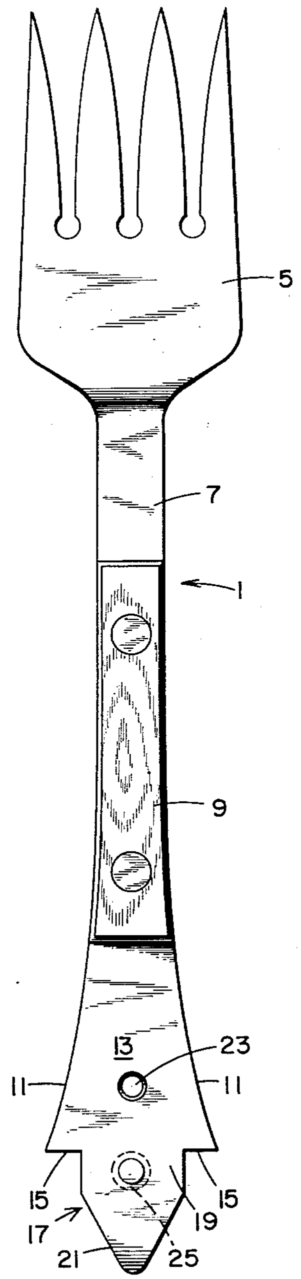
FIG. 1 is a plan view of the front side of the fork member.

In the accompanying drawings I have used the numeral 1 to designate in its entirety one of the cutlery members of the tong set and the numeral 3 to designate in its entirety the other cutlery member of the set. The cutlery member 1 includes a fork element 5 at one end and the cutlery member 3 includes a spatula element 6 at one end thereof.

While I have illustrated my serving tong set as comprising a fork member and a spatula member, it is to be understood that a spoon, knife or the like cutlery element could be used in place of either of the disclosed members and the resulting set would fall within the spirit and scope of my invention.

The cutlery member 1 comprises the usual pronged fork portion 5 formed on the front end of an elongated flat strip-like handle section 7. The handle may be made of any suitable material having a degree of resilience for a reason to be hereinafter made clear. Substantially intermediate the ends of the handle I fix in any suitable manner hand grasp elements 9, one being fixed to each side of the handle 7. The elements 9 may be formed of wood or any other material which is not a good conductor of heat.

Figure 2:
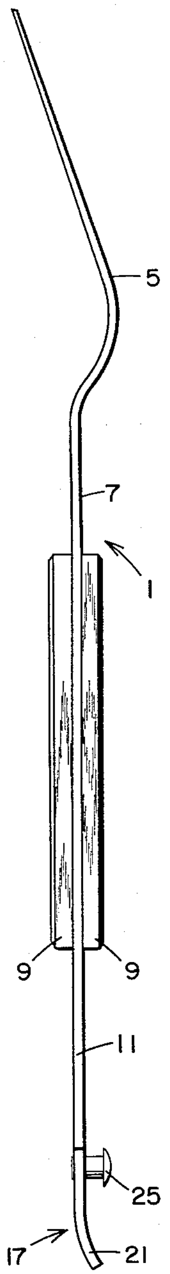
FIG. 2 is an edge view of the fork member.
Figure 3:
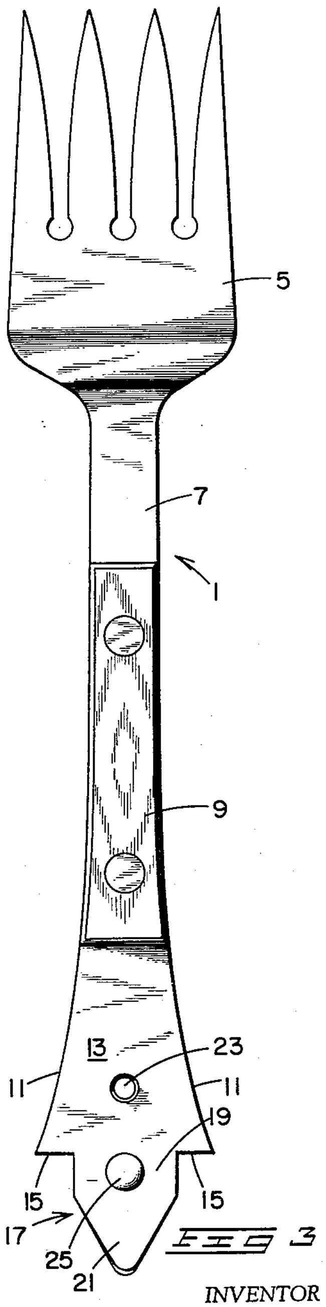
FIG. 3 is a plan view of the rear side of the fork member.
Figure 4:
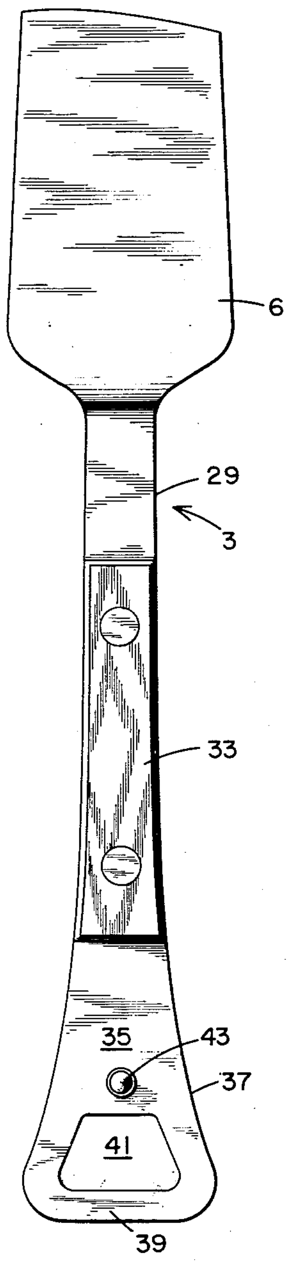
FIG. 4 is a plan view of the front side of the spatula.
Figure 5:
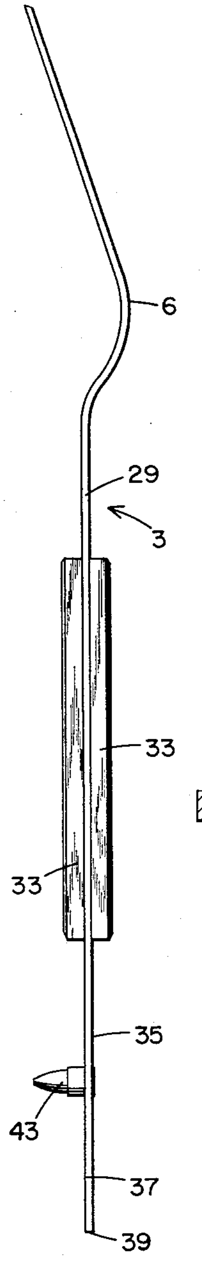
FIG. 5 is an edge view of the spatula member.
Figure 6:
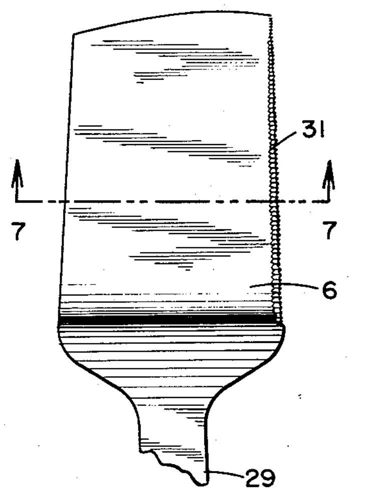
FIG. 6 is a view of the spatula with the remainder of the member broken away and illustrating the serrated edge of the spatula.
Figure 7:
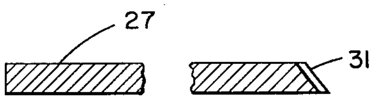
FIG. 7 is a section on line 7—7 of FIG. 6.

Rearwardly of the hand grasp elements 9 the handle 7 is gradually widened rearwardly providing rearwardly diverging edges 11, which form a body portion 13. The rearmost ends of the diverging edges 11 are inwardly extended to form bearing shoulders or surfaces 15 for a purpose to be hereinafter described. I provide a tongue or tang designated generally by numeral 17 which extends rearwardly from body portion 13, the tongue providing a main section 19 and a pointed section 21, the pointed section being bent, as is clearly illustrated in FIG. 2 of the drawings. Formed within body portion 13 is a circular opening 23 and I provide a headed rivet 25 projecting from the back surface of main section 19.

The cooperating member of the tong set is the member 3, which for purposes of illustration, I have shown as a spatula 6 formed on and extending from the forward end of a flat strip-like handle 29. The spatula may, if desired, be formed with a serrated cutting edge 31 to add to the versatility of the cutlery implement. Hand grasp elements 33, similar to elements 9, are formed on handle 29. The handle 29 rearwardly of the hand grasp elements 33 provides a body portion 35 having rearwardly diverging edges 37 terminating in a transverse strip 39. A trapezoidal opening 41 is formed inwardly of strip 39. Fixed to and extending forwardly from body portion 35 is a pointed pin or projection 43, the purpose of which will become apparent as this description proceeds. Like the handle 9 of member 1, the handle 29 is formed of a material having a degree of resilience. I have successfully formed the spatula and fork and the handles thereof of stainless steel.

It will be evident that the cutlery members 1 and 3 may be used independently of each other, but I have provided novel and ingenious means whereby these two members may be removably joined together for functioning as food serving tongs, all as particularly illustrated in FIGS. 8 through 11.

Figures 8, 9:
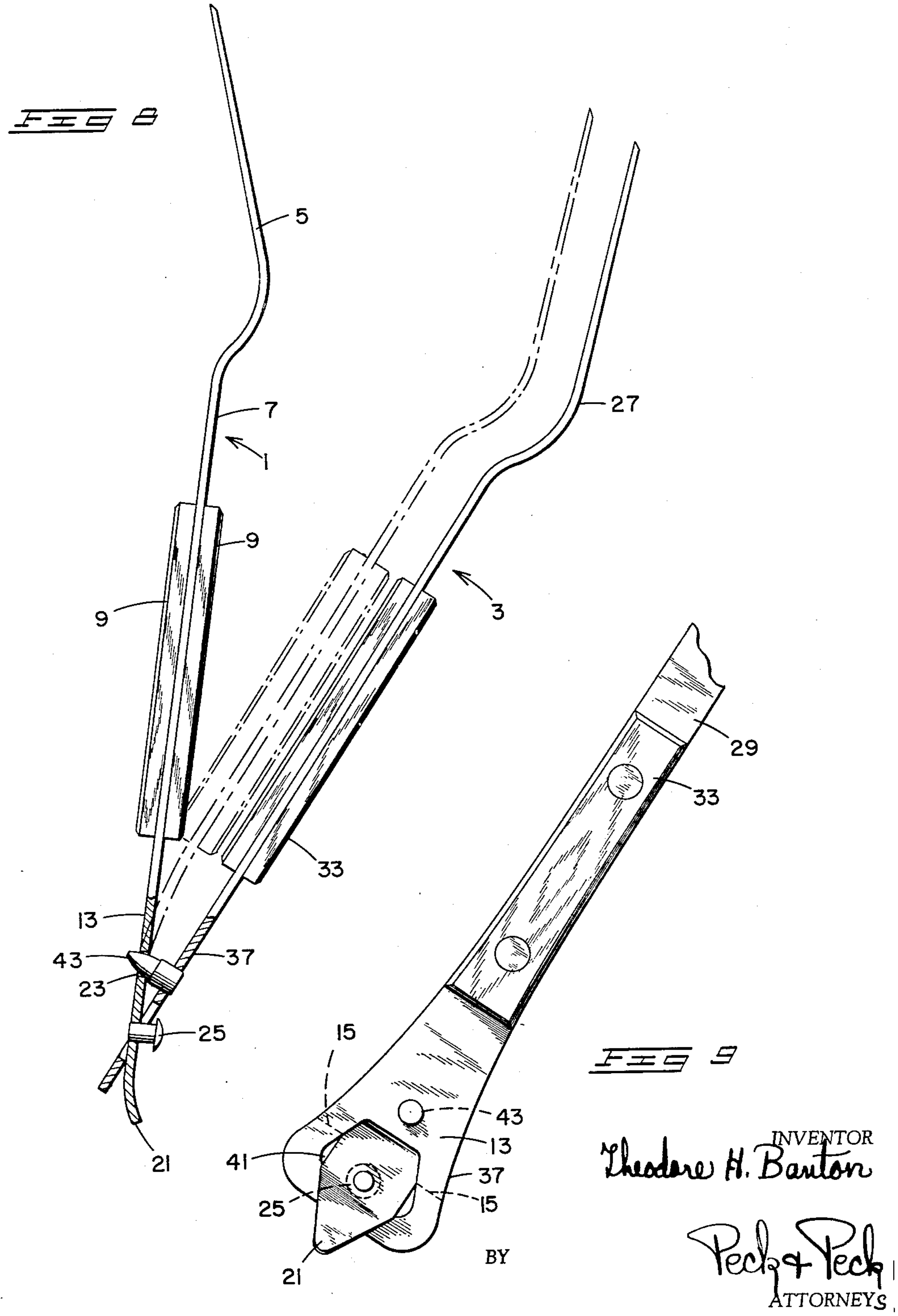
FIG. 8 is a view in side elevation of the two members connected together forming the serving tongs and with the back of the fork directed toward the front of the spatula.
FIG. 9 is a plan view of the pivotal connection of the members as illustrated in FIG. 8.

In order to combine the two members 1 and 3 together to provide a tong set as illustrated in FIGS. 8 and 9, the fork cutlery member 1 is positioned with the back side thereof directed toward member 3 and the tongue 21 is inserted through opening 41 in the spatula member until bearing surfaces or shoulders 15 engage the body portion 13, as shown in dotted lines in FIG. 9. With the two members joined in this manner, the guide pin 43 will extend into opening 23 and will maintain the two members against lateral displacement and in alinement, as shown in the drawings. This relative positioning of the two members is shown in full lines in FIG. 8 of the drawings. Now to use the joined members as serving tongs, the user grasps hand holds 9 and 33 between the palm and fingers of the hand and exerts pressure inwardly on the members which brings them together in the manner illustrated in FIG. 8. The member 1 which is held by the fingers will be flexed inwardly toward member 3, the body portion 13 flexing and shoulders 15 forming bearing surfaces, or fixed surfaces from which the flexing takes place. When the pressure is released, member 1 will flex back to normal full line position.

Figures 10, 11:
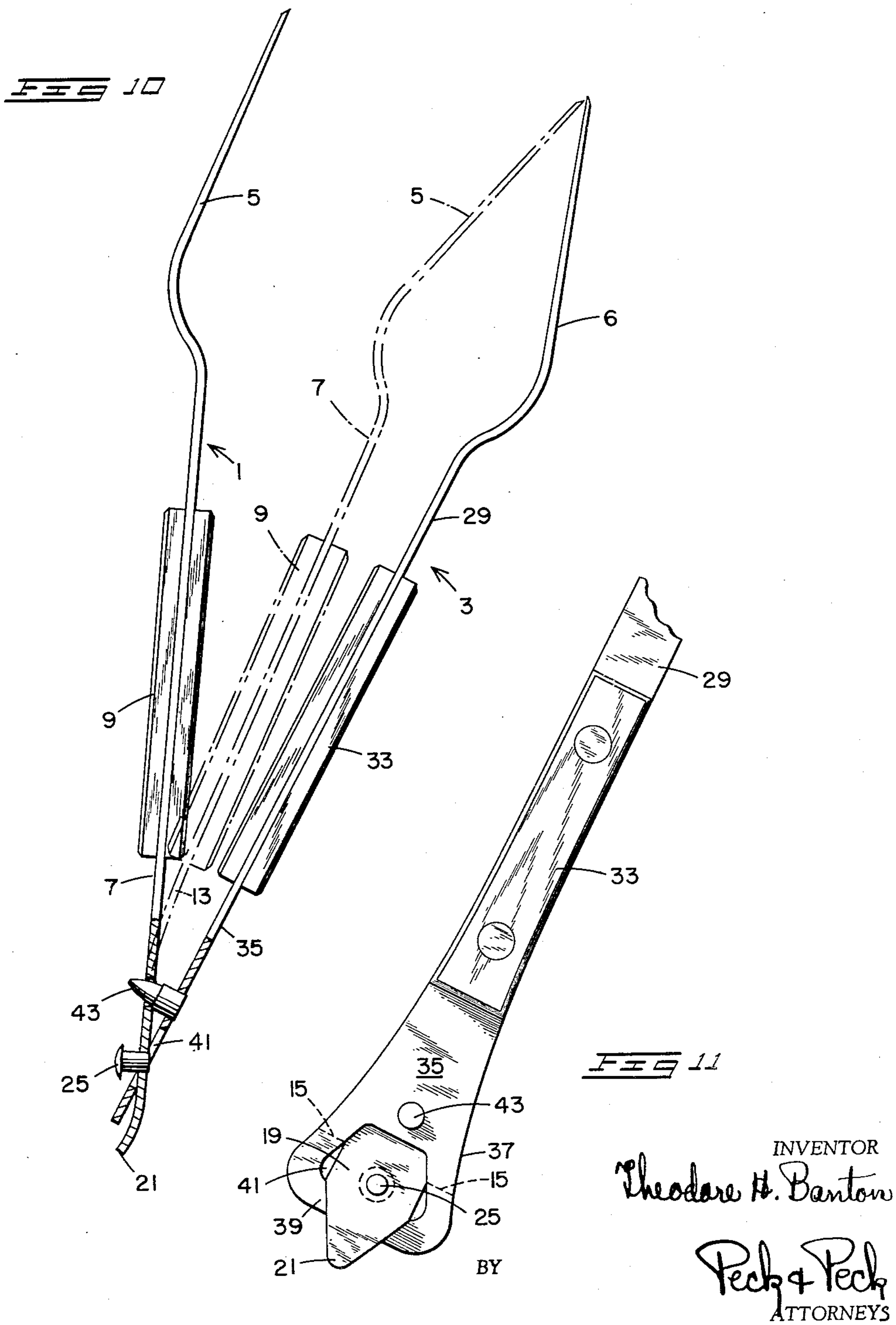
FIG. 10 is a view similar to FIG. 9 but with the position of the fork reversed so that its front side is directed toward the spatula.
FIG. 11 is a plan view of the pivotal connection of the members as illustrated in FIG. 10.

In FIGS. 10 and 11 I have illustrated the member 1 in reversed position with the front face of the fork 1 directed toward the other member 3. The connection of the members and the functioning thereof is the same as described in connection with FIGS. 8 and 9 and will not be again repeated.

As I have stated, the spatula member 3 may be separately used and, of course, the serrated edge 31 may be conveniently used for cutting purposes, while the opening 41 may be employed for lifting conventional bottle caps from bottles. The guide pin 43 functions not only to keep members 1 and 3 in alinement, but also to pierce holes in cans, such, for instance, as milk cans.

The fork member 1, as pointed out above, may be separately used and the pointed tongue or tang 21 may be used to punch holes in cans in combination with rivet 25 which catches under the circumferential bead of the can. The rivet may also serve to lift compression tops from jars.

It will now be evident that I have devised useful cutlery implements having many uses when separately employed and which may be easily and quickly operatively joined together to form a serving tong set. It is also to be understood that the member 1 could comprise the spatula and the member 3 the fork and the functioning and operation of the members would be the same.

I claim:

A serving tong set comprising a pair of cutlery members adapted to be used separately or in releasably connected relationship as a tong set, each cutlery member being provided with a handle having a cutlery element on one end, and means adjacent the opposite end which are coactive when the members are brought together releasably connecting said handle ends together, said means comprising a tongue on one member and said other member being provided with an opening adjacent said opposite end but spaced therefrom providing a strip forming the terminus of said opposite end of the other member, said tongue being freely inserted through said opening and in engagement with said strip and extending therebeyond, shoulders provided adjacent the base of said tongue in engagement with the walls defining said opening to restrain said one member against further travel through said opening when said tongue is fully inserted therein and acting as a bearing surface for the flexing of the members in a serving operation, and one of said members being provided with a rigid pointed projection adjacent to but removed from said opposite end, and the other member being provided with a hole adjacent to but removed from said opposite end, said projection being inserted in said hole to maintain said members against lateral displacement, and said projection being freely removable from said hole.

References Cited in the file of this patent

UNITED STATES PATENTS

| | | |
|---|---|---|
| Re. 7,925 | Ulmer | Oct. 23, 1877 |
| 284,109 | Yonge | Aug. 28, 1883 |
| 972,777 | Richardson | Oct. 11, 1910 |
| 1,643,456 | James | Sept. 27, 1927 |
| 2,137,458 | Phelps | Nov. 22, 1938 |
| 2,201,727 | Henry | May 21, 1940 |
| 2,557,846 | Ste. Marie | June 19, 1951 |
| 2,670,234 | Roop | Feb. 23, 1954 |

FOREIGN PATENTS

| | | |
|---|---|---|
| 1,077,104 | France | Apr. 28, 1954 |
| 1,093,186 | France | Nov. 17, 1954 |
| 180,099 | Great Britain | May 25, 1922 |